United States Patent
Kraus et al.

(10) Patent No.: US 6,694,174 B2
(45) Date of Patent: Feb. 17, 2004

(54) INFRARED THERMOMETER WITH HEATABLE PROBE TIP AND PROTECTIVE COVER

(75) Inventors: Bernhard Kraus, Braunfels (DE); Alexander Klös, Hofheim (DE); Elke Kahler, Griesheim (DE); Frank Beerwerth, Runkel-Ennerich (DE); Horst Mannebach, Butzbach (DE)

(73) Assignee: Braun GmbH, Kronberg im Taunus (DE)

( * ) Notice: Subject to any disclaimer, the term of this patent is extended or adjusted under 35 U.S.C. 154(b) by 58 days.

(21) Appl. No.: 09/526,307

(22) Filed: Mar. 15, 2000

(65) Prior Publication Data

US 2003/0060717 A1 Mar. 27, 2003

(30) Foreign Application Priority Data

Mar. 25, 1999 (DE) .......................... 199 13 672

(51) Int. Cl.[7] .................................. A61B 5/01
(52) U.S. Cl. ................ 600/474; 600/549; 374/121; 374/132
(58) Field of Search ............... 600/474, 549; 374/120, 121, 122, 132

(56) References Cited

U.S. PATENT DOCUMENTS

| | | |
|---|---|---|
| 3,491,596 A | 1/1970 | Dean |
| 4,602,642 A | 7/1986 | O'Hara |
| 4,900,162 A * | 2/1990 | Beckman et al. ........... 374/132 |
| 5,458,121 A * | 10/1995 | Harada ........................ 600/474 |

FOREIGN PATENT DOCUMENTS

| | | |
|---|---|---|
| EP | 0 391 128 A1 | 10/1990 |
| EP | 0 411 121 A | 2/1991 |

* cited by examiner

*Primary Examiner*—Ruth S. Smith
(74) *Attorney, Agent, or Firm*—Morgan, Lewis & Bockius LLP

(57) ABSTRACT

The invention is directed to an infrared thermometer with a heatable probe head, in particular a clinical thermometer for taking a patient's temperature in the ear, and to a heatable protective cover. The probe head possesses a radiation inlet zone at its forward end. A heating element is also arranged there. The heating element is either connected to a protective cover adapted to be fitted over the probe head or secured to the forward end of the probe head.

21 Claims, 2 Drawing Sheets

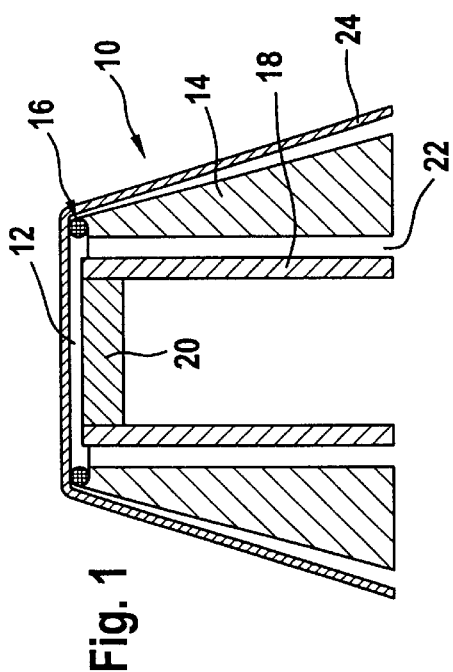
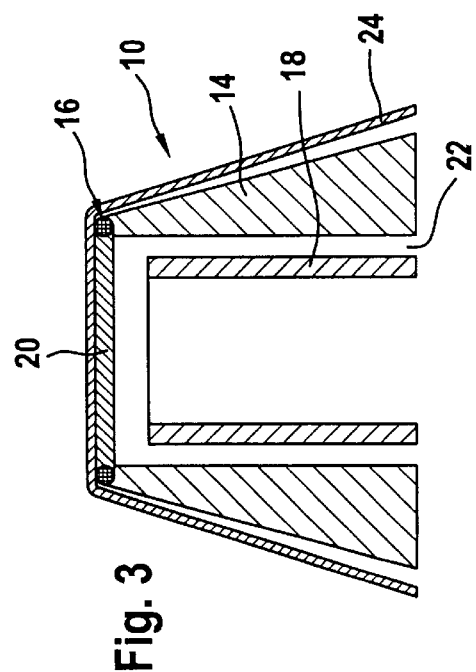
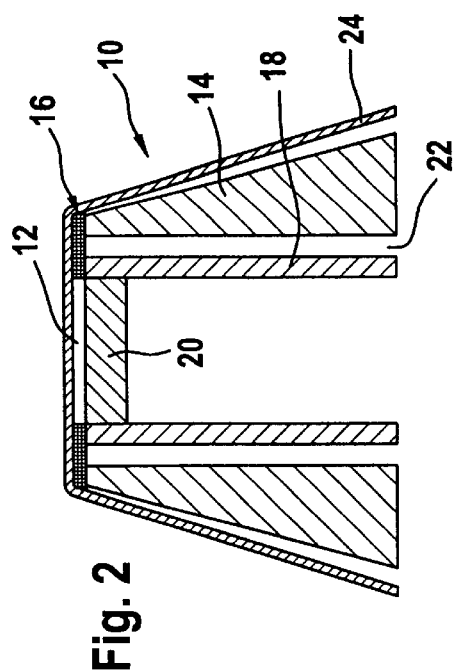
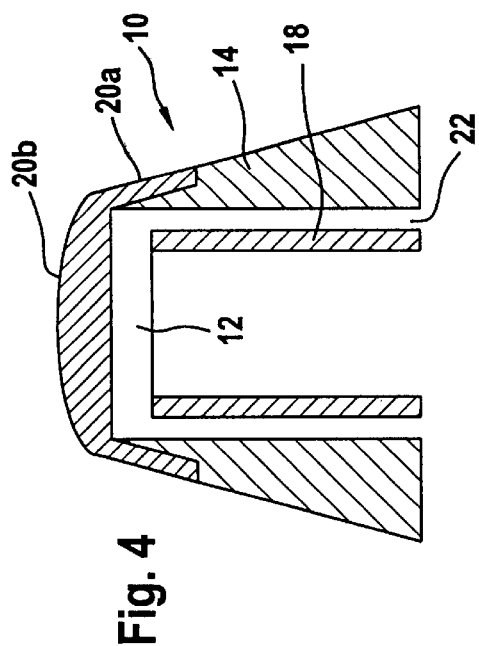

INFRARED THERMOMETER WITH HEATABLE PROBE TIP AND PROTECTIVE COVER

This invention relates to an infrared thermometer with a heatable probe head, in particular a clinical thermometer for taking a patient's temperature in the ear, as well as to a heatable protective cover.

From U.S. Pat. No. 3,491,596 an ear thermometer having a heatable probe head is known. The probe head has at its forward end a cavity receiving a heater element and a field effect transistor serving as heat sensing device. The walls of the cavity are made of a material which is a good heat conductor as, for example, copper. The field effect transistor is thermally coupled to the cavity walls. Radiant heat energy impinging upon the probe head from outside is transferred to the field effect transistor which responds by issuing a corresponding temperature measurement signal. The field effect transistor is preheated by the heater element to a temperature corresponding to the approximate body temperature. This is intended to reduce the response time by comparison with an unheated heat sensing device.

From U.S. Pat. No. 4,602,642 an ear thermometer is known whose probe head includes a waveguide which extends from a forward end of the probe head into the interior of the probe head. At its rear end the waveguide is secured to a metal housing in which a thermopile infrared detector is arranged. The metal housing and the infrared detector connected therewith in a good heat conducting relationship may be heated by heating resistors and a control arrangement to a temperature corresponding to the approximate body temperature. However, for heating such a large part of the thermometer, relatively long heating up periods and correspondingly high amounts of energy are necessary.

By heating the probe head insertable into an auditory canal, a heat flow between the probe head and the auditory canal is largely avoided, that is, the probe head and the auditory canal are in thermal equilibrium during temperature measurement. In this manner, erroneous readings can be avoided which are otherwise introduced by the ear canal's cooling because the probe head introduced into the ear canal has a lower temperature than the ear canal, resulting in a temperature reading which is too low. Such measurement errors depend not only on the initial temperature difference between the probe head and the ear canal and the cooling period or the duration of the measurement process, but are also influenced by the respective positioning or alignment of the probe head inside the ear canal.

When the probe head is pointed directly at the wall of the auditory canal, the infrared radiation emitted by the cold probe head is partially reflected by the wall (reflection factor 3 to 5%, approximately) and detected by the probe head, as a result of which not only the infrared radiation emitted by the cooled off wall of the auditory canal is measured but also the reflected infrared radiation emanating from the probe head itself, resulting in a temperature reading which is correspondingly too low. By contrast, however, when the probe head is properly pointed at the tympanic membrane, the radiation emitted by the cold probe head is first multiply reflected in the auditory canal with corresponding losses before it is again coupled into the probe head, resulting in a correspondingly reduced corruption of the measurement results.

A further disadvantage of an infrared thermometer with an unheated probe head resides in that the temperature of a protective cover mounted over the probe head is subject to relatively severe variations depending on the difference between the ambient temperature and the ear canal temperature as the probe head is introduced into the ear canal. This causes also a variation of the radiant energy emitted by the protective cover, introducing a corresponding measurement error. If, however, the protective cover is heated, the temperature of the protective cover varies hardly at all during a measurement operation because it is determined by the temperature of the probe head.

It is an object of the present invention to provide an infrared thermometer having a heatable probe head in which the necessary heating energy is so low that it can be drawn, for example, from a battery present in the thermometer.

According to the present invention, this object is accomplished in that the probe head and/or a protective cover adapted to be fitted over the probe head in a manner known in the art is/are configured in such fashion that only the forward area of the probe head and/or protective cover is heatable to a temperature corresponding approximately to the typical ear canal temperature.

The configuration of an infrared thermometer's probe head as disclosed in the present invention makes use of the fact that the infrared sensor mounted in the probe head has only a limited field of view. Therefore, it is sufficient for only that part of the probe head to display the same temperature as the ear canal which is in thermal interaction with that part of the ear canal lying in the field of view of the infrared sensor. In a probe head constructed in accordance with the present invention, therefore, practically only the forward end of the probe head, that is, in particular its frontal surface, is designed to be heatable. This relatively small area lends itself to being heated in a highly energy efficient way, and it is preferably thermally insulated from the non heatable part of the probe head.

An infrared thermometer of the present invention has at the forward end of its probe head a radiation inlet zone and a heating element which is preferably electrically heatable. Either the heating element is built into the probe head or a protective cover adapted to fit over the probe head is equipped with a heating element. It is also possible to provide two heating elements one of which is installed in the probe head while the other is connected to a protective cover adapted to fit over the probe head.

The heating element comprises, for example, at least one NTC or PCT resistor or transistor mounted at the forward end of the probe head. However, it is also possible for the heating element to be, for example, a conducting track shaped metallic coating or a coating made of an electrically conductive plastics material which is applied to a radiation inlet window arranged at the forward end of the probe head, the protective cover or the probe head itself and surrounds the radiation inlet zone preferably annularly.

In a preferred embodiment of an infrared thermometer of the present invention, the radiation inlet zone is defined by an infrared transparent window which is heatable by the heating element. This is accomplished particularly simply by a heating wire made of constantan, for example, which is routed around the window and connected thereto in a good heat conducting relationship. The window may be made of a chalcogenide glass, for example, which is transparent to infrared radiation and easily formable. In a particularly sophisticated implementation, the window is made of a semiconductor, in particular silicon, in which an electrically conducting track capable of serving as a resistance heating conductor is formed by doping. The advantage of these embodiments having a heatable window is that the heating element enables the entire forward end of the probe head, that is, the complete frontal surface of the probe head including the radiation inlet zone, to be heated to the desired temperature so that the thermal equilibrium in the ear canal is practically not disturbed by the probe head and erroneous readings attributable thereto are minimized.

An infrared thermometer of the present invention further includes a control device for the heating element which is connected to the heating element and a source of energy, for example, a battery. The control device serves to determine and/or regulate the temperature of the probe head. To this effect, it is connected to a heat flux sensor for detecting the heat flow between the probe head and a user's ear canal and/or to a temperature sensor arranged preferably at the forward end of the probe head. In a preferred embodiment of an infrared thermometer of the present invention, however, the heating element itself is used as sensor instead of providing additional sensors. The control device then determines from measurable characteristic quantities of the heating element as, for example, the electric resistance, the threshold voltage or the forward voltage, the temperature of the heating element and hence the temperature of the forward end of the probe head.

In an infrared thermometer of the present invention affording particular convenience, the control device controls also the processes of activation and deactivation of the heating element prior to and, respectively, subsequent to performing a temperature measurement. The heating cycle is started automatically no later than when the probe head is introduced into a user's auditory canal, and it is terminated likewise automatically after the temperature is taken, the actions of insertion and withdrawal being detectable, for example, by a variation of the radiation temperature measured by a radiation temperature sensor connected to the control device, or by a variation of the probe head temperature measured by the temperature sensor, or by a corresponding signal from the heat flux sensor. In this manner error factors are eliminated and an adequately high accuracy of measurement is ensured at all times.

Preferably, to optimize the accuracy of measurement the heat flow between the probe head and a user's ear canal is determined by means of the heat flux sensor, and the heating output is controlled such as to minimize this heat flow. To maintain the heat flow at a minimum possible level from the outset, the probe head is preferably configured such that thermal capacity and thermal conductivity of the probe head regions contacting the ear canal are as low as possible. Therefore, the surface of these regions is preferably made of plastic.

In a protective cover of the present invention, above all the forward area of the protective cover is heatable by an electric heating element. The protective cover is conically shaped in a manner known in the art, having at its forward end an infrared transmissive radiation inlet zone. The heating element is preferably formed of a conducting track shaped coating of metal or an electrically conductive plastics material surrounding the radiation inlet zone annularly. Energy supply to the heating element is by means of an electrical or electromagnetic connecting device using preferably the battery of the infrared thermometer. This thermometer possesses, for example, suitably arranged contacts making electrical connection with the conducting track shaped coating of the protective cover as it is installed. Alternatively, it is also possible to provide a device for inductive energy transfer to a heating element configured as a short circuit winding.

Further features and advantages of the present invention will become apparent not only from the appended claims but also from the subsequent description of preferred embodiments of probe heads of the invention for infrared thermometers illustrated in the accompanying drawings. In the drawings in which like components are assigned like reference numerals and which are schematic representations, FIG. 1 is a first embodiment of a probe head of the present invention with an annular heating element and a protective cover installed;

FIG. 2 is a second embodiment of a probe head of the present invention with an annular heating element and a protective cover installed;

FIG. 3 is a third embodiment of a probe head of the present invention with a heatable infrared transparent window and a protective cover installed;

FIG. 4 is a fourth embodiment of a probe head of the present invention with a heatable infrared transparent window;

Figure 5:
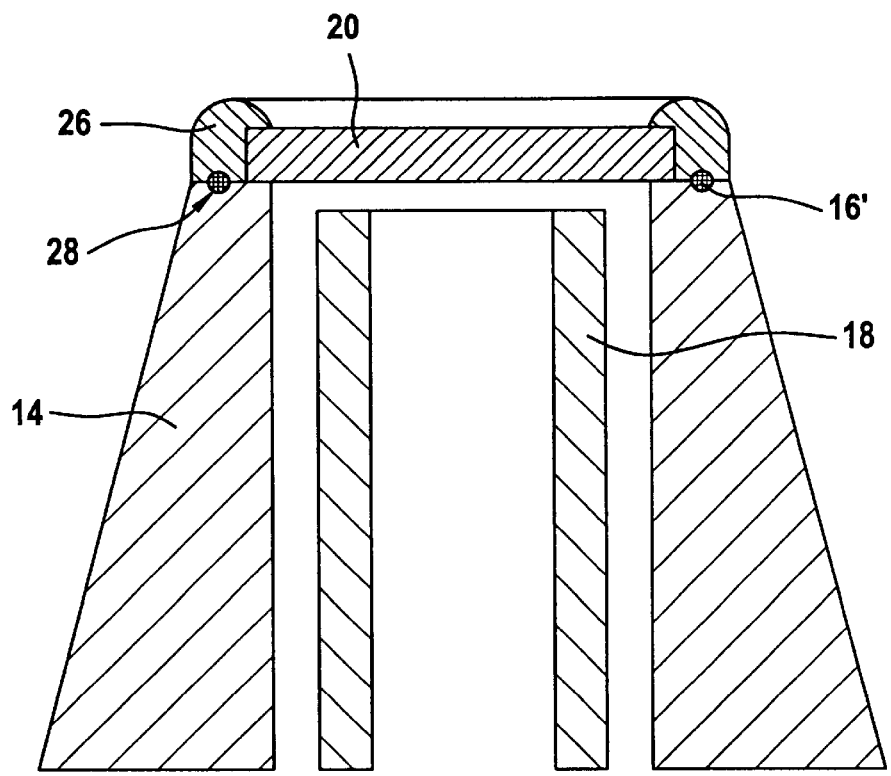
FIG. 5 shows details of the probe head illustrated in FIG. 3 only schematically.

FIG. 1 shows a probe head 10 of the present invention with a probe head housing 14 tapering conically in the direction of a radiation inlet 12 and having at its forward end an annular heating element 16 surrounding the radiation inlet 12. The heating element 16 is preferably electrically heatable. From the radiation inlet 12 an infrared waveguide 18 extends in longitudinal direction through the probe head housing 14 to an infrared sensor, not shown in the Figure, for conversion of the detected infrared radiation into an electrical output signal suitable for evaluation by means of an electronic measuring device, likewise not shown, and indication by an associated indicating device. The forward end of the infrared waveguide 18 is provided with an infrared transparent window 20. For purposes of thermal insulation, a space 22 is maintained between the infrared waveguide 18 and the probe head housing 14. To protect the window from contamination or damage, it is slightly recessed relative to the forward end of the probe head. Fitted to the probe head 10 in a manner known in the art is a replaceable protective cover 24 conforming to the shape of the probe head housing.

The probe head 10 of the present invention illustrated in FIG. 2 differs from the embodiment of FIG. 1 only in that the electrically heatable annular heating element 16 is enlarged in width so as to overlap completely the space 22 between the probe head housing 14 and the infrared waveguide 18. The inner diameter of the annulus 16 corresponds approximately to the inner diameter of the infrared waveguide 18. In this manner the heating element covers the forward end of the probe head except for the radiation inlet 12.

The probe head of the present invention illustrated in FIG. 3 differs from the probe head of FIG. 1 in that the infrared transparent window 20 does not close the forward end of the infrared waveguide 18 but the radiation inlet 12. The heating element 16 is connected to the window 20 so as to establish a good heat conducting relationship thereto. The window is preferably made from a material conducting heat adequately, for example, silicon.

FIG. 5 shows details of the heating element 16 illustrated only schematically in FIG. 3. It includes a frame 26 heatable by a heating wire 16' and surrounding the window 20, its temperature being measurable by a temperature sensor 28. The frame protects the window 20 from damage in addition to providing for a particularly uniform heating of the window 20. The frame is made of aluminum, for example, or a material with comparably good heat conducting properties, and it is thermally insulated relative to the probe head housing 14.

The probe head shown in FIG. 4 differs from the embodiment of FIG. 1 in that the forward end of the probe head terminates in a dome shaped infrared transparent window 20 which is directly heatable by a heating element not shown in the Figure. The window 20 further comprises a temperature sensor, equally not shown, for determining the window temperature. The heating element is, for example, a conducting track made of metal or an electrically conductive plastics material applied to the window. Preferably, however, the window is made of silicon, thus enabling the heating element to be directly integrated into the window by doping a corresponding section of the window. The window temperature is determinable from the electric resistance of the doped section so that a separate temperature sensor may be dispensed with. Alternatively, of course, a temperature sensor may be provided which is preferably configured in the same way as the heating element.

The window possesses preferably conically extending side walls 20a and a frontal surface 20b domed in forward direction for ease of insertion into an ear canal. With this heatable window 20, neither a contact of the ear canal with the side walls 20a nor a corresponding contact with the frontal surface 20b produces an appreciable heat exchange between the window 20 and the ear canal, resulting in a correspondingly low level of corruption of the measurement results. Considering that practically the entire forward area of the probe head 10 is hermetically sealed by the window 20, it is also possible to perform measurements without protective cover.

In all embodiments the heating element is connected to a control device, not illustrated in the Figures, to which in addition a temperature sensor and/or a heat flux sensor may be connected to detect the heat flow between the forward part of the probe head and a user's ear canal. The control device serves the functions of starting, preferably automatically, the heating cycle as the probe head is inserted into an ear canal, of maintaining the temperature of the probe head at a constant level or regulating it for minimizing the heat flow while the radiation temperature measurement is performed, and of terminating, preferably automatically, the heating cycle as the probe head is withdrawn from the ear canal.

Figure 6:
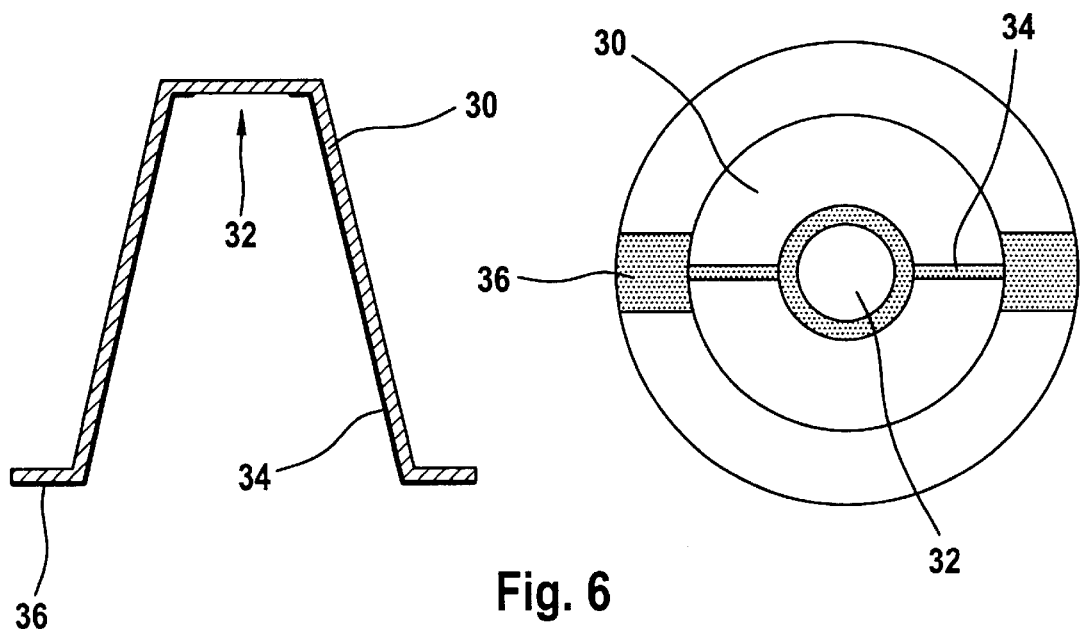
FIG. 6 is a cross sectional and top plan view of a protective cover with heating element.

The heatable protective cover shown in FIG. 6 includes in a manner known in the art a conically shaped plastic body 30 and a radiation inlet zone 32 at its forward end. A heating element configured as a conducting track 34 made of a metallic coating applied to the inside of the plastic body 30 as by vapor deposition, surrounds the radiation inlet zone 32 annularly. The ends 36 of the conducting track are widened to form contacts. It will be appreciated, however, that in lieu of the heatable protective cover 24, the use of a conventional protective cover which is not heatable is equally possible, provided that the probe head itself is equipped with a heating element.

What is claimed is:

1. An infrared thermometer for taking a patient's temperature in the ear, the infrared thermometer comprising an infrared temperature detection mechanism and a probe head associated with a heating element; the probe head having a tip at its forward end, wherein the tip is heatable by the heating element, wherein a radiation inlet zone is provided at the forward end of the probe head, and wherein the heating element is disposed at the forward end of the probe head.

2. The infrared thermometer as claimed in claim 1, wherein the heating element is connected to a protective cover adapted to be fitted over the probe head.

3. The infrared thermometer as claimed in claim 2, further comprising a device for controlling the heating output of the heating element.

4. The infrared thermometer as claimed in claim 2, wherein the heating element is constructed as a conducting track shaped coating of metal or an electrically conductive plastic material.

5. The infrared thermometer as claimed in claim 2, further comprising a device for the supply of energy to the heating element connected with the protective cover.

6. The infrared thermometer as claimed in claim 5, wherein the energy supply device includes an electrical connecting device or an electromagnetic transfer device.

7. The infrared thermometer as claimed in claim 1, wherein the heating element is secured to the forward end of the probe head.

8. The infrared thermometer as claimed in claim 7, further comprising at the forward end of the probe head an infrared transparent window which is heatable by the heating element.

9. The infrared thermometer as claimed in claim 7, further comprising a device for controlling the heating output of the heating element.

10. The infrared thermometer as claimed in claim 7, wherein the heating element is constructed as a conducting track shaped coating of metal or an electrically conductive plastic material.

11. The infrared thermometer as claimed in claim 1, further comprising at the forward end of the probe head an infrared transparent window which is heatable by the heating element.

12. The infrared thermometer as claimed in claim 11, wherein the window is made of a semiconductor, and that an electrically conducting track capable of serving as a resistance heating conductor is formed in the window by doping.

13. The infrared thermometer as claimed in claim 1, further comprising a control device for controlling the heating output of the heating element.

14. The infrared thermometer as claimed in claim 13, further comprising at least one of a temperature sensor and a heat flux sensor connected to the control device.

15. The infrared thermometer as claimed in claim 14, wherein the control device is equipped to determine the temperature of the probe head by measuring defined characteristic quantities of the heating element.

16. The infrared thermometer as claimed in claim 14, wherein while in the presence of variations of the probe head temperature, the control device is operable to at least one of: (i) regulate the heating element to a constant temperature, and (ii) activate and deactivate it.

17. The infrared thermometer as claimed in claim 13, wherein the control device is equipped to determine the temperature of the probe head by measuring defined characteristic quantities of the heating element.

18. The infrared thermometer as claimed in claim 17, wherein while in the presence of variations of the probe head temperature, the control device is operable to at least one of: (i) regulate the heating element to a constant temperature, and (ii) activate and deactivate it.

19. The infrared thermometer as claimed in claim 13, wherein while in the presence of variations of the probe head temperature, the control device is operable to at least one of (i) regulate the heating element to a constant temperature, and (ii) activate and deactivate it.

20. The infrared thermometer as claimed in claim 1, wherein the heating element is constructed as a conducting track shaped coating of metal or an electrically conductive plastic material.

21. An infrared thermometer for taking a patient's temperature in the ear, the infrared thermometer comprising a probe head having: (i) a tip, (ii) a heating element, and (iii) an infrared transparent window, all at the forward end of the probe head; the infrared thermometer further comprising an infrared temperature detection mechanism; wherein the tip is heatable by the heating element.

* * * * *